(12) United States Patent
Kakuta et al.

(10) Patent No.: US 6,989,069 B2
(45) Date of Patent: Jan. 24, 2006

(54) METHOD FOR PRODUCING AN OPTICAL INFORMATION RECORDING MEDIUM

(75) Inventors: Takeshi Kakuta, Kanagawa (JP); Takako Ozawa, Kanagawa (JP); Toshio Ishida, Kanagawa (JP); Akira Mizuta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/318,015

(22) Filed: Dec. 13, 2002

(65) Prior Publication Data

US 2003/0183511 A1 Oct. 2, 2003

(30) Foreign Application Priority Data

| Dec. 14, 2001 | (JP) | ............................. 2001-380894 |
| Mar. 11, 2002 | (JP) | ............................. 2002-065318 |
| Mar. 11, 2002 | (JP) | ............................. 2002-065319 |
| Mar. 14, 2002 | (JP) | ............................. 2002-069579 |

(51) Int. Cl.
*B32B 31/00* (2006.01)
*C09J 7/02* (2006.01)
*G11B 7/24* (2006.01)

(52) U.S. Cl. ...................... 156/264; 156/270; 156/512; 156/513; 156/521

(58) Field of Classification Search ................ 156/512, 156/569, 568, 570, 567, 571, 566, 572, 521, 156/513, 270, 269, 264
See application file for complete search history.

(56) References Cited

FOREIGN PATENT DOCUMENTS

| JP | 63-268783 | * 11/1988 |
| JP | 2000-040255 | 2/2000 |
| JP | 2000-067468 | 3/2000 |
| JP | 2000-298874 | 10/2000 |
| JP | 2001-243658 | 9/2001 |
| JP | 2001-287465 | 10/2001 |
| JP | 2002-140842 | 5/2002 |
| JP | 2003-502783 | 1/2003 |
| JP | 2003-524853 | 8/2003 |

* cited by examiner

*Primary Examiner*—Linda Gray
(74) *Attorney, Agent, or Firm*—Sughrue Mion, PLLC

(57) ABSTRACT

The invention provides a method for manufacturing an optical information recording medium having a track pitch of 200 to 400 nm and a groove depth of 20 to 150 nm, and being capable of recording and reproducing using a light with a wavelength of 450 nm or less, the method at least including: a metal reflective layer forming step for forming a metal reflective layer on a substrate; a recording layer forming step for forming a recording layer of an organic dye type on said metal reflective layer; and a cover layer forming step for forming a cover layer on said recording layer; in this order.

11 Claims, 2 Drawing Sheets

METHOD FOR PRODUCING AN OPTICAL INFORMATION RECORDING MEDIUM

BACKGROUND OF THE INVENTION

1. Field of the Invention

The present invention relates to a method for producing an optical information recording medium of capable of add-on type recording and reproduction with a laser light of a specified wavelength.

2. Description of the Related Art

An optical information recording medium (optical disc) capable of information recording only once with a laser light is already known. Such an optical disc is also called an add-on CD (CD-R), and has a representative structure including, on a transparent disc-shaped substrate, a recording layer composed of by an organic dye, a light reflecting layer formed by a metal such as gold (metal reflective layer) and furthermore, a resinous cover layer (cover layer) laminated successively in this order. The recording of information on such a CD-R is executed by irradiating the CD-R with a laser light of a near infrared region (normally a laser light with a wavelength of approximately 780 nm), whereupon the irradiated part of the recording layer shows a local temperature elevation by light absorption to cause a physical or chemical change (e.g., a pit formation) thereby altering the optical characteristics of such part and thus recording the information. On the other hand, reading (reproduction) of the information is also executed by irradiating the CD-R with a laser light of the same wavelength same as that of the recording laser light, thereby detecting a difference in the reflectance between a part of the recording layer where the optical characteristics are changed (recorded part) and a part where the optical characteristics are not changed (unrecorded part).

Recently the need for optical information recording media of a higher recording density has increased. In order to meet the need, an optical disc known as add-on digital versatile disc (DVD-R) has been proposed (described, for example, in "Nikkei New Media", separate edition "DVD", published 1995). The DVD-R has a structure in which two discs are mutually adhered with recording layers positioned inside, each disc ordinarily including a recording layer containing an organic dye, a light reflecting layer (metallic reflective layer) and a protective layer, laminated in succession in this order on a transparent disc-shaped substrate bearing guide grooves (pre-grooves) for tracking an irradiating laser light, with a groove width (0.74 to 0.8 μm) equal to or less than a half of the groove width in a CD-R, or a structure in which such disc is adhered with a disc-shaped protective substrate of a same shape with the recording layer positioned inside. On a DVD-R thus structured, recording and reproduction of information are executed by irradiation of a visible laser light (having a wavelength ordinarily within a range of 630 to 680 nm), and the recording can be achieved with a recording density higher than that of the CD-R.

Recently, networks such as internet and high-vision television are rapidly increasing in popularity. Also the start of broadcasting of High Definition Television (HDTV) is forthcoming. Hence, there is a demand for a recording medium with a large capacity, capable of easily and inexpensively recording image information. Though the DVD-R is sufficiently serving as the large-capacity recording medium at present, the demand for a higher capacity and a higher density is ever-increasing, and the development of a recording medium capable of meeting those demands is necessary. For this reason, developments are being made for a recording medium with a larger capacity, capable of high-density recording with a light of a shorter wavelength than that of the DVD-R.

For example, JP-A Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028 all disclose recording and reproducing methods for recording and reproducing information by irradiating an optical information recording medium, including a recording layer containing an organic dye, with a laser light of a wavelength not exceeding 530 nm in a direction from the recording layer toward a metallic reflective layer. In these methods, recording and reproduction of information are achieved by irradiating an optical disc, including a recording layer, which contains a porphiline compound, an azo dye, a metal azo dye, a quinophthalone dye, a trimethinecyanine dye, a dye of a dicyanobiphenyl skeleton, a coumarin compound, a naphthalocyanine compound or the like, with a laser light of blue color (wavelength 430 or 488 nm) or blue-green color (wavelength 515 nm).

On the other hand, an optical disc of phase change type is known as a DVD, which is based on a system of employing a layer of an alloy such as GeSbTe for the recording layer, instantaneously heating the recording layer with a laser light to cause a phase change from a crystalline state to an amorphous state and utilizing a change in the reflectance, caused by the phase change, for information recording and reproduction. A DVR system employing a DVD of such phase change type and executing recording and reproduction with a blue-violet laser was recently announced ("ISOM2000", pp. 210–211). This system achieves a certain result for the target toward a higher density.

In an optical information recording medium to be employed in such an optical recording system utilizing a blue-violet laser and a pickup of a high numerical aperture (NA), in order to focus an objective lens of a high NA at the irradiation of the recording layer with a blue-violet laser light, it is preferred to use a thin cover layer through which the laser light enters. The cover layer is formed for example by a thin film, which is adhered to the recording layer with an adhesive material or a sticking adhesive material. A thickness of the cover layer, including an adhesive layer formed by the hardened adhesive material, is usually about 100 μm, but is optimized according to the wavelength and the NA of the irradiating laser light.

Such an optical disc at least includes a recording layer and a cover layer on a disc-shaped substrate, and, during manufacture, is subjected to an adhering step in which a cover sheet is adhered with an adhesive material such as a UV curable adhesive or a sticking adhesive material on a surface, bearing at least the recording layer, of the disc-shaped substrate, thereby forming a cover layer. However, such adhering step is susceptible to formation of a fault portion by causing an inclusion of dust in the adhesive layer, formed by adhering the above-mentioned surface bearing the recording layer and the above-mentioned cover sheet, thus resulting in a dropout in the optical disc, namely in a loss in the production yield.

Also, JP-A No. 2000-67468 discloses a method of forming the cover layer by continuously forming a laminated film member of a configuration in which a laminate member formed by a transparent film and a sticking adhesive sheet is sandwiched on both surfaces between releasing films, then working the laminated film member into a disc shape to obtain a disc-shaped laminated film member, and adhering the laminated film member to the recording layer-bearing surface of optical disk substrate with a positional alignment, while peeling off the releasing film of a side in contact with the sticking adhesive sheet.

With such a method, in case the laminated film member after the continuous formation thereof is wound in a roll, the laminated film member working into the disc shape tends to show a bending by such rolling or a curl, thereby leading to a cover layer having an unflat surface or an unevenness in the thickness. As a result, an optical information recording medium having such a cover layer is unable to achieve satisfactory recording characteristics or a satisfactory durability.

Further, in the manufacturing process of the above-described optical information recording media, in the case of a DVD-R or a CD-R, there is a generally adopted procedure of forming a recording layer on a substrate and then forming a metal reflective layer thereon. Therefore, the surface of the metal reflective layer at the side of the recording layer is not exposed to the air. On the other hand, with a DVR, a procedure has been adopted of forming a metal reflective layer on a substrate and then forming a recording layer thereon, so that a surface of the metal reflective layer at the side of the recording layer is exposed to the air until the formation of the recording layer. The metal reflective layer is generally formed by sputtering a metal such as Ag or Al, and, if thus formed layer is exposed to the air, the surface thereof is oxidized by the moisture in the air or by the influence of temperature, whereby the surface roughness of the metal reflective layer is deteriorated.

SUMMARY OF THE INVENTION

In consideration of the foregoing, an object of the present invention is to provide a method for producing an optical information recording medium having a satisfactory jitter level, low noises and stable recording/reproducing characteristics.

Another object of the present invention is to provide a method for producing an optical information recording medium capable, in an adhering step of adhering a surface bearing a recording layer and an adhering surface of a cover sheet with an adhesive material in manufacturing a high-capacity optical information recording medium, of preventing dust inclusion between the recording layer-bearing surface and the cover sheet, thereby preventing generation of a dropout.

Still another object of the present invention is to provide a method for producing an optical information recording medium utilizing a method for preparing a cover layer including a step of winding such cover layer into a roll, capable of providing an optical information recording medium with excellent recording characteristics and an excellent durability. Still another object of the present invention is to provide a method for producing an optical information recording medium with an excellent productivity.

The above-mentioned objects can be attained by the present invention to be explained in the following. More specifically, as a first embodiment, the invention provides a method for manufacturing an optical information recording medium having a track pitch of 200 to 400 nm and a groove depth of 20 to 150 nm, and being capable of recording and reproducing using a light with a wavelength of 450 nm or less, the method at least comprising:

a metal reflective layer forming step for forming a metal reflective layer on a substrate;

a recording layer forming step for forming a recording layer of an organic dye type on said metal reflective layer; and a cover layer forming step for forming a cover layer on said recording layer;

in this order.

As a second embodiment, the invention provides a method for manufacturing an optical information recording medium as described in the foregoing, wherein said light is a laser light having a wavelength of 450 nm or less, said cover layer has a thickness of 0.01 to 0.5 mm, and a time from immediately after a completion of said metal reflective layer forming step to a start of said cover layer forming step is 12 hours or less.

As a third embodiment, the invention provides a method for producing an optical information recording medium as described in the foregoing, wherein said cover layer in said cover layer forming step is formed by an adhering step for adhering an adhering surface of a cover sheet onto said recording layer with an adhesive material, comprising the steps of adhering the adhering surface of said cover sheet to a surface bearing said recording layer, by peeling off a protective sheet, which is adhered in advance to a surface of said cover sheet opposite to the adhering surface thereof, from the surface of said cover layer.

As a fourth embodiment, the invention provides a method for producing an optical information recording medium as described in the foregoing, wherein said cover layer forming step includes a step of adhering, onto said recording layer, a cover layer composed of a cover film provided with a sticking adhesive layer so that said sticking adhesive layer comes into contact with said surface, and wherein said cover layer is prepared through:

a step of continuously providing a sticking adhesive layer containing a cross-linking agent on a surface of a cover film wound in a roll;

a step of winding said cover film provided with said sticking adhesive layer again into a roll;

a step of storage until a cross-linking reaction of said sticking adhesive layer is substantially terminated;

a step of punching said cover film provided with said sticking adhesive layer into a disc shape; and a step of storing said cover film provided with said sticking adhesive layer of a disc shape in a stack in a substantially horizontal state;

in succession.

As a fifth embodiment, the invention provides a method for producing an optical information recording medium as described in the foregoing, wherein said cover layer forming step includes a step of adhering, onto said recording layer, a cover layer composed of a cover film provided with a sticking adhesive layer so that said sticking adhesive layer comes into contact with said surface, and wherein said cover layer is prepared through:

a step of continuously providing a sticking adhesive layer containing a cross-linking agent on a surface of a cover film wound in a roll;

a step of winding said cover film provided with said sticking adhesive layer again into a roll;

a step of storage until a cross-linking reaction of said sticking adhesive layer is substantially terminated;

a step of punching said cover film provided with said sticking adhesive layer into a disc shape; and a step of storing said cover film provided with said sticking adhesive layer of a disc shape in a stack in a substantially vertical state;

in succession.

In the second embodiment, in a period from the completion of the metal reflective layer forming step to the start of the cover layer forming step, there are preferably adopted a storage temperature of 20 to 40° C. and a storage humidity of 30 to 80%. The metal reflective layer is preferably formed by sputtering. Also the recording layer based on the organic dye is preferably formed by a coating method.

Also in the fourth and fifth embodiments, the step of continuously providing a sticking adhesive layer containing a cross-linking agent on a surface of a cover film wound in a roll is preferably executed by:

a step of continuously coating a sticking adhesive material containing a cross-linking agent on a surface of a releasing film wound in a roll thereby forming a coated layer of the sticking adhesive layer;

a step of drying the sticking adhesive material coated layer formed on the surface of the releasing film; and a step of adhering the sticking adhesive material coated layer in contact with the surface of the cover film.

DETAILED DESCRIPTION OF THE DRAWINGS

DETAILED DESCRIPTION OF THE PREFERRED EMBODIMENTS

Figure 1:
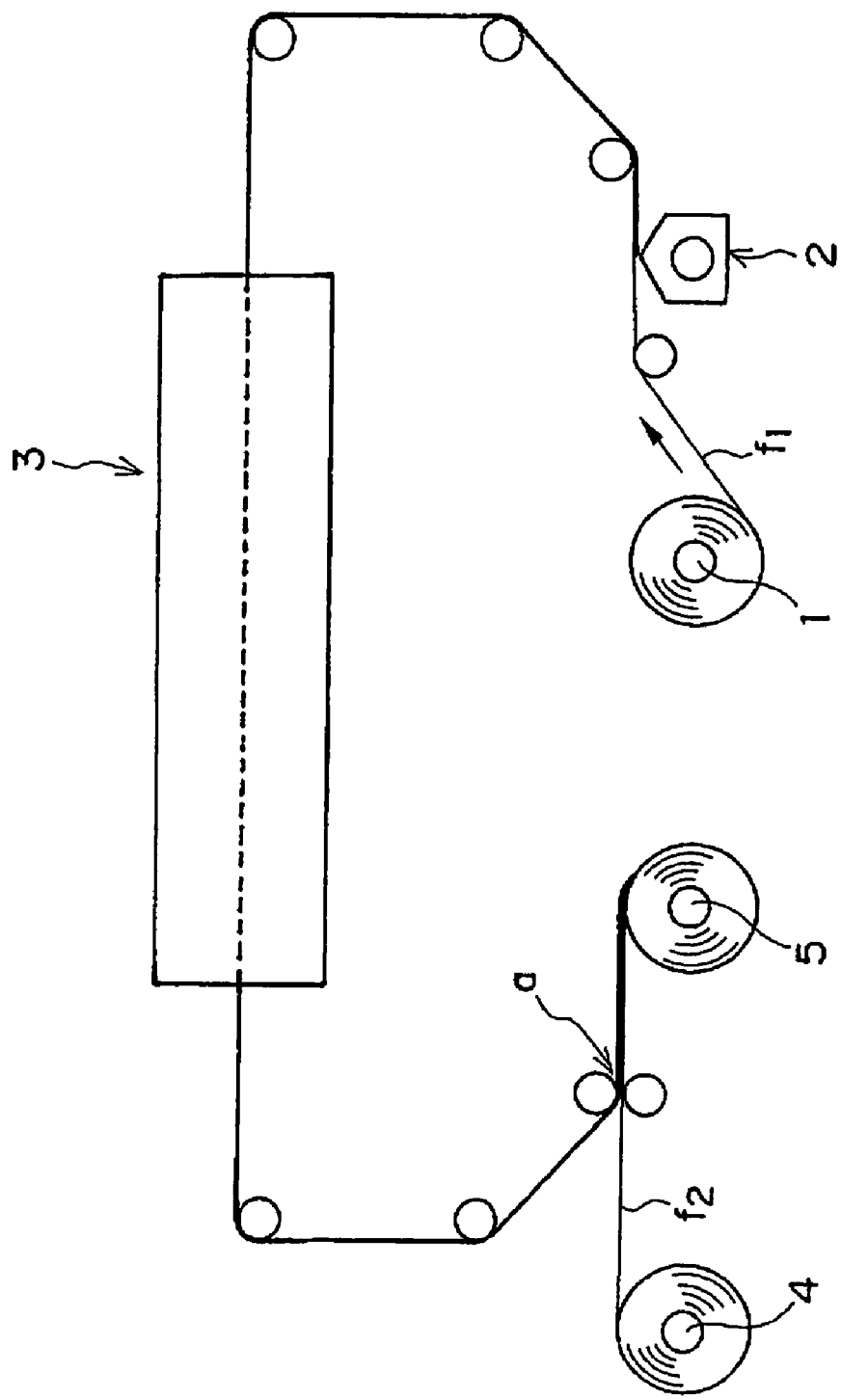
FIG. 1 is a schematic cross-sectional view of an apparatus for providing a sticking adhesive layer, employed in an exemplary embodiment of a method of continuously providing a sticking adhesive layer on a surface of a cover film.

In the following there will be given a detailed explanation on the method for producing the optical information recording medium of the present invention.

At first there will be explained a method for producing a cover layer, featuring the method for producing the optical information recording medium of the present invention.

In the method for producing the optical information recording medium constituting the second embodiment of the present invention, the cover film is prepared by dissolving a photo-curable resin to constitute the adhesive layer in a suitable solvent to prepare a coating liquid, then coating this coating liquid on the recording layer at a predetermined temperature to form a coated film, laminating for example a triacetate cellulose film (TAC film), obtained by solution gliding method, on the coated film and irradiating the coating film with light through the laminated TAC film thereby curing the coated film. The TAC film preferably contains a UV absorbing agent. The cover layer has a thickness within a range of 0.01 to 0.5 mm, preferably 0.03 to 0.3 mm and more preferably 0.05 to 0.15 mm.

In the second embodiment of the invention, a time from immediately after the end of the aforementioned metal reflective layer forming step, through the recording layer forming step, to the start of the cover layer forming step (such time may hereinafter be called "elapsed time") is selected as 12 hours or less. The elapsed time selected as 12 hours or less decreases the influence of water or humidity to the surface of the metal reflective layer to reduce the surface roughness thereof, thereby suppressing the jitter and reducing the noises. An elapsed time exceeding 12 hours induces oxidation of the metal reflective layer by the influence of moisture or temperature in the air, thereby undesirably enlarges the surface roughness.

The elapsed time mentioned above is more preferably 6 hours or less, and most preferably 3 hours or less.

Temperature of storage during such elapsed time is preferably 20 to 40° C. more preferably 20 to 25° C. Also humidity of storage during the elapsed time is preferably 30 to 80%, more preferably 30 to 50%. The surface roughness of the metal reflective layer can be made smaller by maintaining the temperature of storage within a range of 20 to 40° C. and the humidity of storage within a range of 30 to 80% during the elapsed time.

In the third embodiment of the invention, the cover layer means a cover sheet adhered to the recording layer-bearing surface across the adhesive material.

In the third embodiment of the invention, in the adhering step of adhering the adhering surface of the cover sheet and the recording layer-bearing surface with the adhesive material, it is necessary to peel off a protective sheet, adhered in advance to a surface of the cover sheet opposite to the adhering surface thereof, from the surface of the cover sheet after the recording layer-bearing surface and the adhering surface of the cover sheet are mutually adhered.

In case the optical information recording medium is prepared by forming the cover layer by an adhering step of adhering the recording layer-bearing surface and the adhering surface of the cover sheet with the adhesive material, after the protective sheet, adhered in advance to the surface of the cover sheet opposite to the adhering surface thereof, is peeled off from the cover sheet, a dust inclusion is generated between the recording layer-bearing surface of the optical information recording medium and the cover layer to induce a dropout. This is presumably because the peeling of the protective sheet from the cover sheet generates a static electricity to charge the cover sheet, whereby dusts floating in the air are attracted and adsorbed to the adhering surface of the cover sheet.

The cover sheet to be employed in the invention is a sheet-shaped member which is not particularly limited as long as it has a transparency at least to a wavelength of a laser light within a wavelength range of 380 to 500 nm to be employed in information recording on the recording layer, and is capable of physically, chemically and mechanically protecting the recording layer from the exterior and is provided with a protective sheet adhered in advance on a surface of the cover sheet opposite to the adhering surface thereof. The above-mentioned term "transparency" means that it is so transparent (with a transmittance of 80% or higher) as to transmit the above-mentioned laser light. Such cover sheet with the protective sheet is preferably wound in advance as a roll, in consideration of each of storage and transportation.

As a material of the cover sheet, there is preferably employed a resin, more preferably polycarbonate or triacetate cellulose. Further, it preferably has a moisture absorption rate of 5% or less at a temperature of 23° C. and a humidity of 50%. Also in order to prevent a bubble generation in the adhesive layer by the irregularities of the adhering surface at the adhesion of the recording layer-bearing surface and the adhering surface of the cover sheet, it is preferable that the adhering surface is as smooth as possible. More specifically, the cover sheet formed by adhering the protective sheet on the surface of the cover sheet opposite to the adhering surface thereof is for example formed by a polycarbonate sheet or a triacetate cellulose sheet (TAC film). A thickness of the cover sheet is selected within a range capable of protecting the recording layer, and within a range limited in relation with the NA, it is practically selected preferably within a range of 50 to 100 $\mu$m, more preferably within a range of 80 to 95 $\mu$m.

Also the protective sheet is not particularly limited as long as it is capable of physically, chemically and mechanically protecting the cover sheet in the cover sheet provided with the protective sheet, and does not damage the cover layer not leave a deposited substance which is difficult to remove for example by washing on the surface of the cover layer, when the protective sheet is peeled off from the surface of the cover layer after the formation of the cover layer. It is however preferably formed with a resin such as polyethylene terephthalate or polyethylene of a thickness within a range of 10 to 100 μm. Also the protective sheet and the cover sheet are adhered preferably in such a level that they are not separated during the storage or the transportation of the cover sheet with the protective sheet and that each peeling can be realized when the former and the latter are peeled off.

A method of adhering the recording layer-bearing surface and the adhering surface of the cover sheet with the adhesive material may be realized by any known method capable of providing such an adhesion strength that cover layer is not peeled off from the recording layer-bearing surface when the optical information recording medium is handled under ordinarily anticipated environmental conditions.

The above-mentioned adhesive material is preferably a UV curable adhesive which generates an adhering force by curing under a UV irradiation or a sticking adhesive material which is for example coated on a two-side sticky tape or a rear surface of a self-sticking label which instantaneously generates an adhering force under a very small pressure.

In case of employing a UV curable adhesive as the adhesive material, the adhering step is executed for example in the following manner. At first, on the recording layer-bearing surface of the disc-shaped substrate, a UV adhesive material, subjected in advance to vacuum bubble elimination, is so spin coated as to substantially spread in an annular area between an inner peripheral edge of the disc-shaped substrate and a position of X mm in the radial direction toward the external periphery from the inner peripheral edge. In order to securely achieve uniform adhesion by avoiding inclusion of a bubble in the adhesive layer, it is advantageous to execute the coating in a part of the recording layer-bearing surface by selecting the value X within a range of about 10 to 40 mm.

Then the adhering surface of the cover sheet with the protective sheet is overlaid on the recording layer-bearing surface, on which the UV curable adhesive material is coated, and the disc-shaped substrate is rotated again to spread the adhesive material in the entire area between the adhering surface of the cover sheet and the recording layer-bearing surface.

In this state, an ultraviolet irradiation is made with a UV lamp onto the recording layer-bearing surface on which the cover sheet is overlaid, thereby adhering the cover sheet with the protective sheet to the intermediate layer and thus completing the cover layer, and the protective sheet is thereafter peeled off from the surface of the cover layer.

The coating of the adhesive material on the recording layer-bearing surface can be realized by any known method, but is preferably executed by a spin coating method as explained in the foregoing. In view of viscosity control of the adhesive material, there is preferred a coating temperature within a range of 23 to 50° C., more preferably 24 to 40° C. and most preferably 25 to 37° C.

After the recording layer-bearing surface and the adhering surface of the cover sheet are adhered with the adhesive material, there is required a UV irradiation in case a UV curable adhesive is employed as the adhesive material. A UV irradiating device to be employed for the UV irradiation is not particularly limited, but is preferably a UV irradiating device of pulsed type.

In case of employing a UV irradiating device of pulsed type, the pulses preferably have an interval of 10 second or less, more preferably 1 second or less. An irradiating power per pulse is not particularly limited, but is preferably 3 kw/cm$^2$ or less, more preferably 2 kw/cm$^2$ or less. A number of irradiating pulses is not particularly limited, but is preferably 20 or less, more preferably 10 or less.

The above-described UV curable adhesive is not particularly limited as long as it can adhere the surface of the recording layer and the adhering surface of the cover sheet under curing by the UV irradiation, but there is preferred an adhesive with a small contraction rate at the curing, in order to prevent bending of the optical information recording medium. Such UV curable adhesive can be, for example, SD661 (manufactured by Dai-Nippon Inks and Chemicals Inc.), SD-640 (manufactured by Dai-Nippon Inks and Chemicals Inc.), SD-347 (manufactured by Dai-Nippon Inks and Chemicals Inc.), SD-694 (manufactured by Dai-Nippon Inks and Chemicals Inc.), or SKCD1051 (manufactured by SKC Inc.) (above listed are all trade names), and these materials are preferably used after bubble elimination under vacuum.

In case of employing a sticking adhesive material as the adhesive for the adhesion, it is not particularly limited as long as it can adhere the recording layer-bearing surface and the adhering surface of the cover sheet. At the use of such sticking adhesive material, it is possible to adjust the sticking adhesive material to a suitable size, then apply it to the recording layer-bearing surface, then peeling of a separator or the like, adhering the cover sheet to form the cover layer and peeling off the protective sheet from the surface of the cover layer.

In case of employing a two-side sticky tape as the sticking adhesive material, a base material of such two-side sticky tape is not particularly limited and can be for example a plastic film such as of polyethylene terephthalate, polypropylene, polyethylene or polyvinyl chloride, paper such as craft paper, bond paper, clay coated paper or Japanese paper, a non-woven cloth such as of rayon or polyester, a woven cloth of synthetic fibers such as of polyester, nylon or an acrylic resin, or a metal foil such as of aluminum, copper or stainless steel, but a plastic film is preferred in consideration of ease of a uniform striped coating of a releasing agent on the base material.

Also as a releasing agent to be used in the two-side sticky tape, there may be suitably selected various releasing agents already known, such as a silicone-based releasing agent or a releasing agent of long-chain alkyl type.

Also the sticking adhesive material to be employed above can be that of acrylic type, rubber type or silicone type, but a sticking adhesive material of acrylic type is preferred in consideration of the transparency and the durability. For such sticking adhesive material of acrylic type, there is preferably employed a material obtained by employing for example 2-ethylhexyl acrylate or n-butyl acrylate as a principal component, and copolymerizing thereto a short-chain alkylacrylate or methacrylate such as methyl acrylate, ethyl acrylate or methyl methacrylate in order to increase the coagulating ability, and a component that may constitute a cross-linking point with the cross-linking agent, such as acrylic acid, methacrylic acid, an acrylamide derivative, maleic acid, hydroxylethyl acrylate or glycidyl acrylate. It is possible to change a glass transition temperature (Tg) and a cross-linking density by suitably adjusting the mixing ratio and the kinds of the principal component, the short-chain component and the component for providing the cross-linking point.

Examples of the cross-linking agent to be used in combination with the sticking adhesive material include an isocyanate cross-linking agent, an epoxy resin cross-linking agent, a melamine resin cross-linking agent, a urea resin cross-linking agent and a chalate cross-linking agent, among which preferred the isocyanate cross-linking agent. For such isocyanate cross-linking agent, there can be employed an isocyanate such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate or triphenylmethane triisocyanate, a reaction production of such isocyanate and a polyalcohol, and a polyisocyanate formed by a condensation of isocyanates. Also commercially available products of such isocyanates include Colonate L, Colonate HL, Colonate 2030, Colonate 2031, Millionate MR and Millionate HTL manufactured by Japan Polyurethane Co.; Takenate D-102, Tanate D-110N, Takenate D-200 and Tanenate D-202 manufactured by Takeda Chemical Industries Ltd.; Desmodul L, Desmodul IL, Desmodul N and Desmodul HL manufactured by Sumitomo-Bayer Co.

In the method for producing the optical information recording medium of the fourth and fifth embodiments of the invention, the cover layer is prepared through (a) a step of continuously providing a sticking adhesive layer containing a cross-linking agent on a surface of the cover film wound in a roll, (b) a step of winding the cover film provided with the sticking adhesive layer again into a roll, (c) a step of holding the cover film until a cross-linking reaction of the sticking adhesive layer is substantially terminated, (d) a step of punching the cover film provided with the sticking adhesive layer into a disc shape, and (e) a step of maintaining the disc-shaped cover film provided with the sticking adhesive layer in a substantially horizontally stacked state, in succession.

Each of these steps will be explained in the following.

(a) A Step of Continuously Providing a Sticking Adhesive Layer Containing a Cross-Linking Agent on a Surface of the Cover Film Wound in a Roll A method for continuously providing a sticking adhesive layer containing a cross-linking agent on a surface of the cover film is roughly divided into a method of applying a sticking adhesive layer prepared in advance to the surface of the cover film (hereinafter occasionally called indirect method) and a method of coating and drying a sticking adhesive material directly on the surface of the cover film (hereinafter occasionally called direct method).

In the indirect method, the sticking adhesive layer can be adhered continuously to the surface of the cover film for example through a sticking adhesive layer providing apparatus as shown in FIG. 1. FIG. 1 is a schematic cross-sectional view of a sticking adhesive layer providing apparatus, employable in an exemplary embodiment of the method of continuously providing the sticking adhesive layer on the surface of the cover film. Such sticking adhesive layer providing apparatus can also execute therein a step (b) of winding the cover film provided with the sticking adhesive layer again into a roll, to be explained later.

As shown in FIG. 1, the sticking adhesive layer providing apparatus includes a roll 1 formed by winding a releasing film $f_1$, a coating unit 2, a drying unit 3, a roll 4 formed by winding a cover film $f_2$, a roll 5 to be formed by co-winding the releasing film $f_1$ provided with the sticking adhesive layer and the cover film $f_2$.

The sticking adhesive layer providing apparatus functions in the following manner. At first the releasing film $f_1$ is advanced from the roller 1, formed by winding the releasing film $f_1$, in a direction indicated by an arrow. An unrepresented control unit, upon confirming that a front end of the advanced releasing film $f_1$ has been conveyed to a predetermined area (coating area), causes the coating unit 2 provided in such area to start the coating of a sticking adhesive coating liquid, prepared in advance, on the surface of the releasing film $f_1$ (coating step). Such coating step provides the releasing film $f_1$ bearing a coated layer of the sticking adhesive material. Such coating step of the sticking adhesive material is continued until the releasing film $f_1$ wound in the roll 1 is advanced to the rear end thereof.

The unrepresented control unit, upon confirming that the releasing film $f_1$ bearing a coated layer of the sticking adhesive material has been conveyed to a drying area, causes the drying unit 3 provided in such drying area to dry the coated layer of the sticking adhesive material (drying step), such step causes evaporation of a solvent in the coated layer of the sticking adhesive material, thereby providing the releasing film $f_1$ provided with the sticking adhesive layer. The releasing film $f_1$ bearing the sticking adhesive layer is further advanced and is adhered, in an adhering area a, with the cover film $f_2$ advanced from the roll 4, in such a manner that the surface of the cover film $f_2$ and the adhesive layer are mutually contacted (adhering step). Then the releasing film $f_1$ having the sticking adhesive layer and the cover film $f_2$ are co-wound in the roll 5 (winding step). In the sticking adhesive layer providing apparatus, these serial steps are executed in continuous manner until the releasing film $f_1$ of a roll is advanced from the roll 1 and is wound up on the roll 5.

In the sticking adhesive layer providing apparatus, the coating means 2 can be any known coating means. More specifically, there can be employed coating means such as of spray coating, roller coating, blade coating, doctor roll coating or screen printing.

Also as the drying means 3, there can be employed conventionally known drying means such as heat drying or air drying.

In the direct method, the cover film is advanced from a roll, and is coated continuously with the sticking adhesive coating liquid from the front end to the rear end of such cover film to form a coated layer of the sticking adhesive material, and such coated layer of the sticking adhesive material is dried in succession to form the sticking adhesive layer on the entire area of one of the surfaces of the cover film.

Also in the coating and drying steps in the direct method, there may be employed coating means and drying means similar to those in the sticking adhesive layer providing apparatus explained in the foregoing.

The releasing film $f_1$ to be employed in the step (a) can be, for example, a polyethylene film, a polyethylene terephthalate film, a polyethylene naphthalate film, a polycarbonate film or a triacetate cellulose film.

The cover film $f_2$ to be employed in the step (a) is not particularly limited as long as it is formed by a transparent material, but is preferably formed by an acrylic resin such as polycarbonate or polymethyl methacrylate; a vinyl chloride resin such as polyvinyl chloride or a vinyl chloride copolymer; an epoxy resin; an amorphous polyolefin; a polyester; or triacetate cellulose, and more preferably polycarbonate or triacetate cellulose.

The term "transparent" means a transmittance of 80% or higher to the light used for recording and reproduction.

Since the cover film $f_2$ is wound again into a roll in the step (b) to be explained later, the cover film $f_2$ is preferably subjected to a releasing process on a surface not provided with the sticking adhesive layer, in order to facilitate the winding operation. The releasing process to be employed can be, for example, a method of roughing the surface itself of the cover film $f_2$, a method of adhering a film having a releasing property, or a method of forming a releasing layer for example by a coating method. Among these, there is preferred a method of adhering a film having a releasing property.

The cover film $f_2$ may further include various additives within an extent not hindering the effect of the present invention. For example, it may contain a UV absorber for cutting off a light of a wavelength of 400 nm or shorter, or a dye for cutting off a light of a wavelength of 500 nm or longer.

As the physical properties, the cover film $f_2$ preferably has a surface roughness of 5 nm or less both in a two-dimensional roughness parameter and a three-dimensional roughness parameter. Also in view of condensing the light to be employed for recording and reproduction, the cover film preferably has a birefringence not exceeding 10 nm.

The cover film in a roll form can be, for example, a film of a width of 150 mm and a length of 200 m, wound on a core of 150 mm$\phi$.

The cover film $f_2$ preferably has a thickness within a range of 0.03 to 0.15 mm, more preferably within a range of 0.05 to 0.12 mm. A thickness within such range facilitates the handling of the cover film in the adhering step, and also provides an advantage of suppressing a coma aberration.

(b) A Step of Winding the Cover Film Provided with the Sticking Adhesive Layer Again into a Roll Through this step, the cover film provided with the sticking adhesive layer and wound in a roll state is easier to transport in comparison with the plate-shaped laminated members of a same amount and provides an advantage of a superior conveyability. Consequently, the cover film provided with the sticking adhesive layer and wound again into a roll, after a series of the sticking adhesive layer providing steps by the aforementioned sticking adhesive layer providing apparatus, can be easily detached from the apparatus and can be easily transferred to the succeeding step (c).

(c) A Step of Holding the Cover Film Until a Cross-Linking Reaction of the Sticking Adhesive Layer is Substantially Terminated This step is executed for improving the sticking property of the sticking adhesive layer and the adhesion with the adhering surface of the recording layer or the intermediate layer, thereby improving the durability of the optical information recording medium.

In this step, the cover film provided with the sticking adhesive layer and wound in the roll state in the preceding step (b) is held until the cross-linking reaction of the sticking adhesive layer is terminated substantially. The expression that "the cross-linking reaction of the sticking adhesive layer is terminated substantially" means a period that "when the sticking adhesive layer is measured by an infrared absorption spectrum, a peak derived from a functional group involved in the cross-linking of the employed cross-linking agent substantially vanishes", and this period can be suitably regulated by the thickness of the sticking adhesive layer, the sticking adhesive material constituting the sticking adhesive layer, the kind of the cross-linking agent, and the environment (temperature and humidity) of the holding space.

The period corresponding to that "the cross-linking reaction of the sticking adhesive layer is terminated substantially" can be determined, for example a sticking adhesive layer (X) formed by an acrylic sticking adhesive material as the sticking adhesive material and an isocyanate cross-linking agent as the cross-linking agent, by measuring the infrared absorption spectrum of such sticking adhesive layer in time in an environment of a temperature of 23° C. and a humidity of 50% RH, and measuring a time required by an absorption peak, observable at about 2275 to 2250 cm$^{-1}$ prior to the holding (immediately after coating) and derived from the isocyanate, to vanish substantially.

The period corresponding to that "the cross-linking reaction of the sticking adhesive layer is terminated substantially" is specifically 72 hours in an ordinary room temperature environment (a temperature of 21 to 30° C. and a humidity of 30 to 80% RH). Consequently, the cover film provided with the sticking adhesive layer has to be held for 72 hours or longer under such environment.

(d) A Step of Punching the Cover Film Provided with the Sticking Adhesive Layer into a Disc Shape This step punches the cover film, provided with the sticking adhesive layer and formed as a roll, into a predetermined shape, namely a disc shape of a size same as that of the substrate.

More specifically, the cover film provided with the sticking adhesive layer and formed in a roll is advanced, and, in a temporarily flattened state, is continuously punched into a size same as that of the substrate for example with a cut punch.

Thereafter the cover film provided with the sticking adhesive layer, other than the punched portions, is wound again into a roll whereby the waste material generated by punching can be easily recovered.

Figure 2:
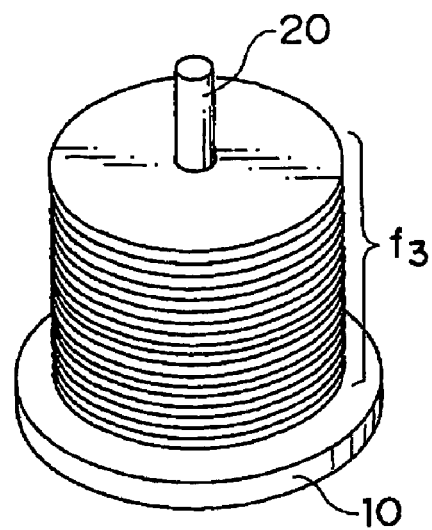
FIG. 2 is a schematic view showing a state where disc-shaped cover films provided with sticking adhesive layers are substantially horizontally stacked on holding means.
Figure 3:
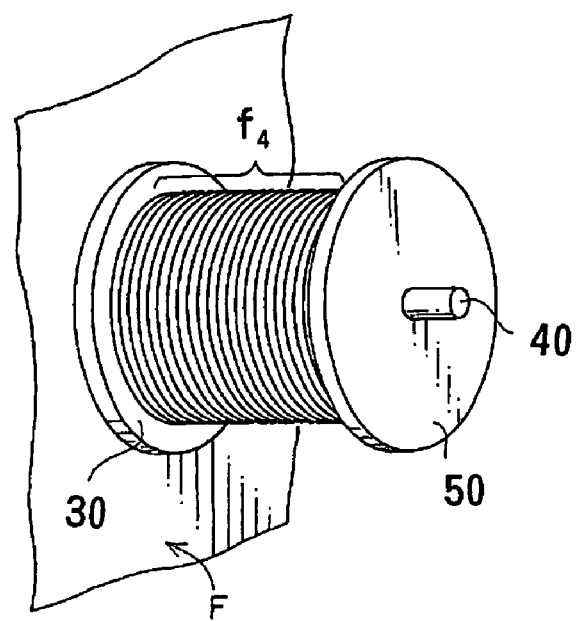
FIG. 3 is a schematic view showing a state where disc-shaped cover films provided with sticking adhesive layers are substantially vertically stacked on holding means.

(e) A Step of Maintaining the Disc-Shaped Cover Film Provided with the Sticking Adhesive Layer in a Substantially Horizontally Stacked State This step is executed for correcting strains such as a curl, a curvature resulting from winding or an anisotropy in the cover film provided with the sticking adhesive layer. Such step will be explained in more details with reference to FIGS. 2 and 3. FIG. 2 is a schematic view showing a state where disc-shaped cover films provided with sticking adhesive layers are stacked substantially horizontally on holding means, and FIG. 3 is a schematic view showing a state where disc-shaped cover films provided with sticking adhesive layers are stacked substantially vertically on holding means.

In the present invention, "substantially horizontal" includes a state where an upper surface (surface of an uppermost layer) of a stack, formed by stacking the disc-shaped cover films provided with the sticking adhesive layers may be slightly inclined from a horizontal state, prior to an application of a load, due to the shape of each cover film provided with the sticking adhesive layer and/or due to holding means to be explained later. Also "substantially vertical" includes a state where an outer surface (surface of an outermost layer) of a stack, formed by stacking the disc-shaped cover films provided with the sticking adhesive layers may be slightly inclined from a vertical state, prior to a provision of a spacer, due to the shape of each cover film provided with the sticking adhesive layer and/or due to holding means to be explained later.

As shown in FIG. 2, the holding means in the step of holding in a substantially horizontal stack includes a base 10, and a stock jig 20 having an external diameter slightly smaller than a center hole of a disc-shaped cover film $f_3$ provided with a sticking adhesive layer.

The disc-shaped cover film $f_3$ provided with the sticking adhesive layer is stacked on the base 10, in a state where the center hole is fitted on the stock jig 20, in a predetermined number, for example in 50 units.

Also as shown in FIG. 3, the holding means in the step of holding in a substantially vertical stack includes a base 30, a stock jig 40 having an external diameter slightly smaller than a center hole of a disc-shaped cover film $f_4$ provided with a sticking adhesive layer, and a spacer 50 for substantially vertically holding the stack of the disc-shaped cover film $f_3$ provided with the sticking adhesive layer.

The base 30 is fixed to a fixed surface F by an unrepresented fixing member. The disc-shaped cover film $f_4$ provided with the sticking adhesive layer is stacked, in a state where the center hole is fitted on the stock jig 40 provided perpendicularly to the base 30, in a predetermined number, for example in 50 units. The spacer 50 is provided, in consideration of a thickness of a stack of 50 sheets of the disc-shaped cover film $f_3$ provided with the sticking adhesive layer, at a distance from the base 30 equal to or slightly smaller than the thickness of the stack. In this manner such stack can be held substantially vertically, without being inclined.

Also the strains can be corrected in an even shorter time by a method of applying a load in a direction indicated by an arrow, thereby making the distance from the base 30 to the spacer 50 smaller than the thickness of the stack of the disc-shaped cover film $f_4$ provided with the sticking adhesive layer. The load is preferably within a range of 10 to 500 g.

By holding this state for a predetermined period, for example 1 hour, the disc-shaped cover film $f_3$ or $f_4$ provided with the sticking adhesive layer is corrected from the strains such as curl, curvature resulting from winding or anisotropy. Such holding time can be suitably adjusted according to the thickness of the cover film, the thickness of the sticking adhesive layer, the sticking adhesive material constituting the sticking adhesive layer, the kind of the cross-linking agent and other additives, and the environment (temperature and humidity) of the holding space.

It is also possible to correct the strains in an even shorter time, by applying a load from the uppermost part of the stack of the disc-shaped cover film $f_3$ or $f_4$ provided with the sticking adhesive layer.

The cover layer thus prepared shows a high adhering property to the adhering surface of the recording layer or the intermediate layer because the cross-linking reaction of the sticking adhesive layer is substantially completed, and also provides an excellent effect of a reduced unevenness on the surface or in the thickness because the strains such as the curl, the curvature caused by winding or the anisotropy are corrected. Also the process of preparing the cover layer is excellent in conveyability as it is executed in entirely continuous manner and includes the aforementioned steps (b) and (d), and also provides an excellent productivity because the waste material can be easily recovered.

The optical information recording medium can be produced by adhering such cover layer onto the surface of the recording layer provided on the substrate, in such a manner that the sticking adhesive layer comes into contact with such surface. The optical information recording medium thus produced has excellent recording characteristics and an excellent durability.

The method for producing the optical information recording medium of the present invention includes, in addition to the step for preparing the cover layer explained in the foregoing, various known steps including a light reflective layer forming step for forming the light reflective layer on the substrate and a recording layer forming step for forming the recording layer on the light reflective layer, which will be explained later.

It is also possible to provide a reflective layer between the surface of the substrate and the recording layer, or an intermediate layer between the recording layer and the cover layer.

In case the optical information recording medium includes an intermediate layer between the recording layer and the cover layer, the adhering step to be executed in the present invention is achieved by adhering the surface (recording layer-bearing surface) of the intermediate layer and the adhering surface of the cover sheet in a manner explained in the foregoing.

Also in case the optical information recording medium does not include any intermediate layer between the recording layer and the cover layer, the adhering step to be executed in the present invention is achieved by adhering the surface (recording layer-bearing surface) of the recording layer and the adhering surface of the cover sheet in a manner explained in the foregoing.

Light Reflective Layer Forming Step

The light reflective layer forming step is a step of forming a light reflective layer of a light reflective material on a surface, bearing pregrooves, of the substrate to be explained later.

For the substrate, there can be employed a material arbitrarily selected from those employed in the known optical information recording medium.

Specific examples of such material include glass; an acrylic resin such as polycarbonate or polymethyl methacrylate; a vinyl chloride resin such as polyvinyl chloride or a vinyl chloride copolymer; an epoxy resin; an amorphous polyolefin; a polyester; and a metal such as aluminum, and these materials may also be used in a combination if desired.

Among these materials, in consideration of the moisture resistance, the dimensional stability and the inexpensiveness, amorphous polyolefin and polycarbonate are preferred, and polycarbonate is particularly preferred. The substrate preferably has a thickness within a range of 1.1±0.3 mm.

The substrate is provided with irregularities (pre-grooves) constituting guide grooves for tracking or representing information such as an address signal. For achieving a higher recording density, there are required pre-grooves of a smaller track pitch than in the CD-R or in the DVD-R. For example, in case of use as a medium such as the DVR-blue, the track pitch of the pre-grooves has to be within a range of 200 to 400 nm, preferably 250 to 350 nm. Also the pre-grooves have to have a depth (groove depth) within a range of 20 to 150 nm, preferably within a range of 30 to 100 nm.

On a surface of the substrate, at a side where the light reflective layer to be explained later is to be provided, an undercoat layer is preferably formed for the purpose of improving flatness and adhesive power.

Examples of the material for the undercoat layer include a polymer such as polymethyl methacrylate, an acrylic acid-methacrylic acid copolymer, a styrene-maleic anhydride copolymer, polyvinyl alcohol, N-methylolacrylamide, a styrene-vinyltoluene copolymer, chlorosulfonated polyethylene, nitrocellulose, polyvinyl chloride, chlorinated polyolefin, polyester, polyimide, a vinyl acetate-vinyl chloride copolymer, an ethylene-vinyl acetate copolymer, polyethylene, polypropylene or polycarbonate; and a surface modifying agent such as a silane coupling agent.

The undercoat layer can be formed by dissolving or dispersing the above-mentioned material in a suitable solvent to obtain a coating liquid, and coating such coating liquid on the surface of the substrate by a coating method such as spin coating, dip coating or extrusion coating. The undercoat layer has a thickness generally within a range of 0.005 to 20 μm, preferably within a range of 0.01 to 10 μm.

The light reflective layer can be formed by evaporating, sputtering or ion-plating, on the substrate, a light reflecting substance having a high reflectance to the laser light. The light reflective layer has a thickness generally within a range of 10 to 300 nm, preferably within a range of 50 to 200 nm.

The reflectance mentioned above is preferably 70% or higher.

Examples of the light reflecting substance with a high reflectance include a metal and a semi-metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn or Di, and stainless steel. These light reflecting substances may be used singly or in a combination of two or more kinds, or as an alloy. Among these, there is preferred Cr, Ni, Pt, Cu, Ag, Au, Al or stainless steel. Particularly preferred is Au, Ag, Al or an alloy thereof, and most preferred is Au, Ag or an alloy thereof.

Intermediate Layer Forming Step

In case an intermediate layer is provided, a material therefor is not particularly limited as long as the laser light of a wavelength region of 380 to 500 nm can be transmitted with a transmittance of 90% or higher, but the material constituting the intermediate layer is preferably a dielectric substance such as glass or ceramics capable of transmitting the above-mentioned wavelength region, among which more preferred is ZnS—SiO$_2$ or SiO$_2$.

The intermediate layer can be formed on the substrate for example by evaporating, sputtering or ion plating the above-mentioned substance. A thickness of the intermediate layer, being limited by the numerical aperture and a relationship with the thickness of the cover layer to be formed on the intermediate layer, is practically preferred within a range of 1 to 300 nm, more preferably within a range of 2 to 200 nm.

Recording Layer Forming Step

The recording layer forming step is to forming the recording layer on the light reflective layer. The recording layer preferably includes a dye as a recording material capable of information recording with a laser light of a wavelength equal to or less than 600 nm, or particularly a wavelength equal to or less than 450 nm in the aforementioned first embodiment. Examples of such dye contained in the recording layer include a cyanine dye, an oxonol dye, a metal complex dye, an azo dye, a phthalocyanine dye, a benzotriazole dye, and an aminobutadiene dye.

It is preferably at least one of a triazole compound, a phthalocyanine compound, a porphiline compound, an aminobutadiene compound, a cyanine compound and the like, and the phthalocyanine compound is preferably at least one of an alkoxy substituted compound, a sulfonamide substituted compound, a sulfomoyl substituted compound and a sulfonic acid substituted compound.

There can also be employed in combination dyes described in JP-A Nos. 4-74690, 8-127174, 11-53758, 11-334204, 11-334205, 11-334206, 11-334207, 2000-43423, 2000-108513 and 2000-158818.

In addition to the dyes described in the foregoing, there can also be advantageously employed other organic compounds such as a triazole compound, a triazine compound, a cyanine compound, a merocyanine compound, an aminobutadiene compound, a phthalocyanine compound, a cinnamic acid compound, a viologen compound, an azo compound, an oxonolbenzooxazole compound or a benzotriazole derivative, among which particularly preferred is a cyanine compound, an aminobutadiene compound, a benzotriazole compound or a phthalocyanine compound.

Particularly in the aforementioned second embodiment, it is preferred that the recording layer is capable of information recording with a laser light of a wavelength of 380 to 500 nm and with an objective lens of a numerical aperture (NA) of 0.7 or larger. The dye to be contained in such recording layer can be, in addition to those described in the foregoing, for example a recording material such as compound 1 or compound 2 shown in the following. Also the recording layer may include two or more different dyes.

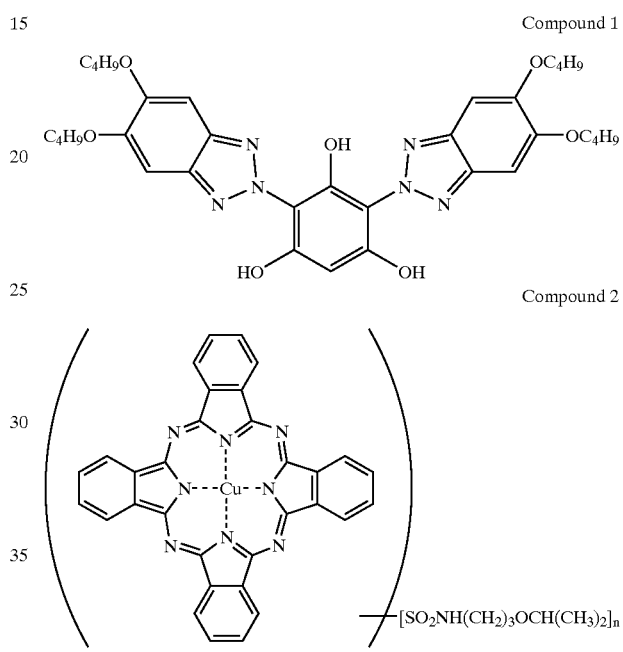

Compound 1

Compound 2

The recording layer is prepared by dissolving a recording material such as a dye, together with a binder or the like, in a suitable solvent to prepare a coating liquid, and coating such coating liquid on the light reflective layer formed on the substrate surface to form a coated film, followed by drying. The concentration of the recording material in the coating liquid is generally within a range of 0.01 to 15 mass %, preferably 0.1 to 10 mass %, more preferably 0.5 to 5 mass % and most preferably 0.5 to 3 mass %.

Examples of the solvent for the coating liquid include an ester such as butyl acetate, ethyl lactate or cellosolve acetate; a ketone such as methylethyl ketone, cyclohexanone or methylisobutyl ketone; a chlorinated hydrocarbon such as dichloromethane, 1,2-dichloroethane or chloroform; an amide such as dimethylformamide; a hydrocarbon such as methylcyclohexane; an ether such as tetrahydrofurane, ethylether or dioxane; an alcohol such as ethanol, n-propanol, isopropanol, n-butanol or diacetone alcohol; a fluorinated solvent such as 2,2,3,3-tetrafluoropropanol; and a glycolether such as ethyleneglycol monomethylether, ethyleneglycol monoethylether or propyleneglycol monomethylether.

These solvents may be used singly or in a combination of two or more kinds, in consideration of the solubility of the recording material to be used. The coating liquid may be added further with various additives such as an antioxidant, a UV absorber, a plasticizer or a lubricant according to the purpose.

In case of using a binder, examples of such binder include a natural organic polymer substance such as gelatin, a cellulose derivative, dextran, rosin or rubber; a hydrocarbon resin such as polyethylene, polypropylene, polystyrene or polyisobutylene; a vinylic resin such as polyvinyl chloride, polyvinylidene chloride, polyvinyl chloride-polyvinyl acetate copolymer; an acrylic resin such as polymethyl acrylate or polymethyl methacrylate; polyvinyl alcohol, chlorinated polyethylene, an epoxy resin, a butyral resin, a rubber derivative and a synthetic organic polymer such as an initial condensate of a thermo-settable resin such as a phenol-formaldehyde resin. In case a binder is used in combination as a material of the recording layer, the amount of the binder is generally within a range of 0.01 to 50 times (mass ratio) with respect to the recording material, preferably within a range of 0.1 to 5 times (mass ratio). A concentration of the recording material in thus prepared coating liquid is generally within a range of 0.01 to 10 mass %, preferably 0.1 to 5 mass %.

The coating can be achieved by spray coating, spin coating, dip coating, roller coating, blade coating, doctor roller coating, screen printing or the like. The recording layer may be constructed as a single layer or superposed layers. The recording layer has a thickness generally within a range of 20 to 500 nm, preferably within a range of 30 to 300 nm, and more preferably within a range of 50 to 100 nm. Also the coating liquid has a temperature preferably within a range of 23 to 50° C., more preferably 24 to 40° C., and most preferably 23 to 50° C.

In order to avoid bending of the disk, the ultraviolet irradiation of the coated film is preferably executed with a light irradiator (preferably UV irradiator) of a pulse type. An interval of pulses is preferably 1 millisecond or less, more preferably 1 microsecond or less. An amount of irradiating light per pulse is not particularly limited, but is preferably 3 kW/cm$^2$ or less, more preferably 2 kW/cm$^2$ or less.

A number of irradiating pulses is not particularly limited, but is preferably 20 times or less, more preferably 10 times or less.

In order to improve the light fastness of the recording layer, the recording layer may contain various antifading agents.

For the antifading agent, a singlet oxygen quencher is generally employed. As the singlet oxygen quencher, there can be utilized those described in already known published references such as patent specifications.

Specific examples include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, JP-B Nos. 1-38680 and 6-26028, German Patent No. 350399 and Bulletin of Japanese Chemical Society, p. 1141, October 1992.

The amount of the antifading agent such as the aforementioned single oxygen quencher is usually within a range of 0.1 to 50 mass % with respect to the amount of the dye, preferably 0.5 to 45 mass %, more preferably 3 to 40 mass % and particularly preferably 5 to 25 mass %.

Intermediate Layer Forming Step

In the method for producing the optical information recording medium of the invention, an intermediate layer may be provided on the recording layer. The intermediate layer is provided in order to improve the storability of the recording layer and to improve the adhesion of the recording layer and the cover layer. A material employed in the intermediate layer is not particularly restricted as long as the light used for recording and reproduction can be transmitted, but a dielectric material is generally preferred. Specific examples include a nitride, an oxide, a carbide and a sulfide of Zn, Si, Ti, Te, Sn, Mo and Ge, among which preferred is ZnS, MoO$_2$, GeO$_2$, TeO, SiO$_2$, TiO$_2$, ZnO, ZnS—SiO$_2$ or SnO$_2$ and more preferred is ZnS—SiO$_2$, SiO$_2$ or SnO$_2$. Such intermediate layer can be formed by a film formation method in vacuum such as evaporation or sputtering.

The optical information recording medium can be obtained by adhering the laminate member which is formed through the light reflective layer forming step, the recording layer forming step, and the intermediate layer forming step if necessary, and the cover layer prepared by the aforementioned step of forming the cover layer.

The present invention has been explained, as an example, by a method for producing an optical information recording medium provided with a recording layer containing an organic compound such as a dye as a recording material, but the recording layer may also be a phase change recording layer for recording by a phase change or a magnetooptical recording layer for recording by a magnetooptical phenomenon. For example, in case of a phase change recording layer, a dielectric layer is formed for example by ZnS—SiO$_2$, and a dielectric layer is provided instead of the light transmitting layer. Also in the phase change recording layer, there may be employed, as the recording material, a metal compound for example of a chalcogenide such as Sb, Te, Ag or In.

EXAMPLES

In the following, the present invention will be further clarified by examples, but the invention is not at all limited by such examples.

Example 1-1

On a grooved surface of an injection molded polycarbonate substrate (polycarbonate Panlite AD5503 (trade name), manufactured by Teijin Ltd.) of a thickness of 1.1 mm and a diameter of 120 mm, having spiral grooves (track pitch: 30 nm, groove depth: 40 nm, groove width: 150 nm), Ag was sputtered under sputtering conditions of a sputtering power of 0.2 kW and an Ar flow rate of 50 cm$^3$/sec to form a reflective layer of a thickness of 100 nm. Then, Orazol Blue GN (trade name; manufactured by Ciba Fine Chemical Ltd.) was mixed with 2,2,3,3-tetrafluoropropanol and was subjected to an ultrasonic irradiation for 2 hours for dissolution to obtain a dye coating liquid. This dye coating liquid was spin coated with a revolution varying from 300 to 4000 rpm under conditions of 23° C. and 50% RH to obtain a recording layer. Then an annealing was conducted for 2 hours under conditions of 23° C. and 50% RH, and a UV curable adhesive (trade name SD347, manufactured by Dai-Nippon Ink and chemicals Ltd., solubility in dye: 0.05 mass %) was spin coated with a revolution of 100 to 300 rpm, was then spread over the entire surface by overlaying a polycarbonate sheet (Pure Ace (trade name), manufactured by Teijin Ltd., film thickness 70 μm) and under a revolution varying from 300 to 4000 rpm, and cured by ultraviolet irradiation with a UV irradiation lamp to obtain a cover layer of a thickness of 100 μm, thereby obtaining an optical information recording medium of the example 1-1. An elapsed time from immediately after the formation of the reflective layer to the start of the formation of the cover layer was selected as 1 hour, and a storage temperature and a storage humidity in such time were respectively selected as 23° C. and 50%.

Example 1-2

An optical information recording medium of an example 1-2 was obtained in the same manner as in the example 1-1, except that the elapsed time from immediately after the formation of the reflective layer to the start of the formation of the cover layer was selected as 6 hours, and a storage temperature and a storage humidity in such time were respectively selected as 23° C. and 50%.

Example 1-3

An optical information recording medium of an example 1-3 was obtained in the same manner as in the example 1-1, except that the elapsed time from immediately after the formation of the reflective layer to the start of the formation of the cover layer was selected as 12 hours, and a storage temperature and a storage humidity in such time were respectively selected as 23° C. and 50%.

Example 1-4

An optical information recording medium of an example 1-4 was obtained in the same manner as in the example 1-1, except that the elapsed time from immediately after the formation of the reflective layer to the start of the formation of the cover layer was selected as 1 hour, and a storage temperature and a storage humidity in such time were respectively selected as 40° C. and 50%.

Example 1-5

An optical information recording medium of an example 1-5 was obtained in the same manner as in the example 1-1, except that the elapsed time from immediately after the formation of the reflective layer to the start of the formation of the cover layer was selected as 1 hour, and a storage temperature and a storage humidity in such time were respectively selected as 40° C. and 80%.

Example 1-6

An optical information recording medium of an example 1-6 was obtained in the same manner as in the example 1-1, except that Al was employed instead of Ag employed for forming the reflective layer in the example 1-1 and was sputtered under sputtering conditions of a sputtering power of 3.0 kW and an Ar flow rate of 50 cm$^3$/sec to obtain a reflective layer of a thickness of 100 nm.

Example 1-7

An optical information recording medium of an example 1-7 was obtained in the same manner as in the example 1-1, except that the elapsed time from immediately after the formation of the reflective layer to the start of the formation of the cover layer was selected as 1 hour, and a storage temperature and a storage humidity in such time were respectively selected as 45° C. and 50%.

Example 1-8

An optical information recording medium of an example 1-8 was obtained in the same manner as in the example 1-1, except that the elapsed time from immediately after the formation of the reflective layer to the start of the formation of the cover layer was selected as 1 hour, and a storage temperature and a storage humidity in such time were respectively selected as 40° C. and 90%.

Comparative Example 1-1

An optical information recording medium of a comparative example 1-1 was obtained in the same manner as in the example 1-1, except that the elapsed time from immediately after the formation of the reflective layer to the start of the formation of the cover layer was selected as 13 hours.

Comparative Example 1-2

An optical information recording medium of a comparative example 1-2 was obtained in the same manner as in the comparative example 1-1, except that a storage temperature and a storage humidity in the elapsed time were respectively selected as 40° C. and 50%.

Comparative Example 1-3

An optical information recording medium of a comparative example 1-3 was obtained in the same manner as in the comparative example 1-1, except that a storage temperature and a storage humidity in the elapsed time were respectively selected as 40° C. and 80%.

Comparative Example 1-4

An optical information recording medium of a comparative example 1-4 was obtained in the same manner as in the comparative example 1-1, except that a storage temperature and a storage humidity in the elapsed time were respectively selected as 45° C. and 50%.

Comparative Example 1-5

An optical information recording medium of a comparative example 1-5 was obtained in the same manner as in the comparative example 1-1, except that a storage temperature and a storage humidity in the elapsed time were respectively selected as 40° C. and 90%.

Evaluation

The optical information recording media obtained in the foregoing examples and comparative examples were subjected to following evaluations (1) to (3). Results of evaluations are shown in Table 1.

(1) Average Projection Diameter at 15 nm from Reference Plane of Surface of Reflective Layer An optical information recording medium, after the formation of the reflective layer but prior to the formation of the cover layer, was measured with an atomic force microscope (AFM) under following measuring conditions to determine an average surface roughness sRa which was defined as a reference plane, and an average diameter Dv of projections at a height of 15 nm from the reference plane. The average diameter Dv of the projections means an average value of diameters when a cross section of each projection is regarded as a circle. The surface projections become larger and the surface becomes rougher as this value increases.

Measuring Conditions

Apparatus: SPA500 (trade name), manufactured by Seiko Instruments Inc.
Mode: AFM mode (contact mode)
Measuring probe: SI AF01 (spring constant: 0.1 N/m)
Measuring range: 10 μm square
Scan lines: 512×512
Scan speed: 2 Hz.

(2) Jitter Evaluation

An optical information recording medium having a cover layer was subjected to recording and reproduction of a 1–7

PP modulated signal under a clock frequency of 66 MHz and a linear velocity of 5.6 m/sec, by a recording-reproduction evaluation device (DDU1000 (trade name), manufactured by Pulsetech Inc.), provided with an optical pickup emitting a laser light of a wavelength of 405 nm and having a lens of a numerical aperture (NA) of 0.85, and a jitter was measured by a time interval analyzer.

(3) Noise Evaluation

An optical information recording medium having a cover layer was subjected to recording and reproduction in a similar manner as in (2) by a recording-reproduction evaluation device same as used in (2), then a reflectance in an unrecorded part was measured by an oscilloscope and an unrecorded noise was defined by (signal amplitude/signal magnitude).

TABLE 1

|  | Elapsed time (hr) | Storage temp. (°C.) | Storage humidity (%) | Reflective layer metal | Average projection diameter Dv at 15 nm from reference plane (nm) | Jitter (%) | Noise (%) | Evaluation |
|---|---|---|---|---|---|---|---|---|
| Ex.1-1 | 1 | 23 | 50 | Ag | 45 | 7.2 | 5.3 | ++ |
| Ex.1-2 | 6 | 23 | 50 | Ag | 52 | 7.8 | 5.9 | ++ |
| Ex.1-3 | 12 | 23 | 50 | Ag | 80 | 8.5 | 6.2 | + |
| Ex.1-4 | 1 | 40 | 50 | Ag | 60 | 7.6 | 6.5 | + |
| Ex.1-5 | 1 | 40 | 80 | Ag | 75 | 3.0 | 6.8 | + |
| Ex.1-6 | 1 | 23 | 50 | Al | 50 | 7.4 | 5.5 | ++ |
| Ex.1-7 | 1 | 45 | 50 | Ag | 65 | 8.5 | 7.0 | ± |
| Ex.1-8 | 1 | 40 | 90 | Ag | 88 | 8.8 | 7.2 | ± |
| Comp. Ex.1-1 | 13 | 23 | 50 | Ag | 110 | 13.1 | 10.3 | − |
| Comp. Ex.1-2 | 13 | 40 | 50 | Ag | 125 | 14.0 | 11.8 | − |
| Comp. Ex.1-3 | 13 | 40 | 80 | Ag | 130 | 16.5 | 12.0 | − |
| Comp. Ex.1-4 | 13 | 45 | 50 | Ag | 128 | 16.0 | 13.2 | − |
| Comp. Ex.1-5 | 13 | 40 | 90 | Ag | 132 | 18.5 | 14.0 | − |

In table 1, the optical information recording media of the examples and the comparative examples were rated as ++ in case of particularly satisfactory recording and reproduction characteristics; + in case of satisfactory recording and reproduction characteristics; ± in case the characteristics are somewhat inferior but are practically acceptable; and − in case the characteristics are practically unacceptable.

Table 1 indicates that the optical information recording media of the examples 1-1 to 1-6, in which the elapsed time from after the formation of the reflective layer to the formation of the cover layer was made 12 hours or less, showed small values in the surface roughness of the reflective layer, the jitter and the noise. In particular, more satisfactory result could be obtained in the examples 1-1 to 1-6 in which the storage temperature and the storage humidity in the elapsed time were selected respectively in 20 to 40° C. and 30 to 80%.

In contrast, the optical information recording media of the comparative examples 1-1 to 1-5 in which the elapsed time exceeded 12 hours could not provide satisfactory results because all the surface roughness of the reflective layer, the jitter and the noise were large.

Example 2-1

An injection molded disc-shaped polycarbonate substrate (polycarbonate Panlite AD5503 (trade name), manufactured by Teijin Ltd.) of a thickness of 1.1 mm and a diameter of 120 mm, having spiral grooves (track pitch: 340 nm, groove depth: 20 nm, groove width: 160 nm) was employed, and, on a grooved surface of the substrate, an Ag film of a thickness of 120 nm was formed by sputtering as a reflective film.

Then a dye coating liquid, obtained dissolving an organic substance, represented by the compound 1, as a dye in 3 mass % in methyl lactate and agitating for 2 hours under an ultrasonic irradiation, was spin coated on a surface bearing the reflective layer of the disc-shaped substrate with a revolution varying from 300 to 4000 rpm under conditions of 23° C. and 50% RH to obtain a recording layer, which was then subjected to an annealing for 2 hours under conditions of 23° C. and 50% RH. Then, on a surface of thus formed recording layer, an intermediate layer of ZnS—SiO$_2$ of a thickness of 5 nm was formed by sputtering.

Then, on a surface of thus formed intermediate layer, a UV curable adhesive (trade name SD661, manufactured by Dai-Nippon Ink and Chemicals Ltd.), subjected in advance to bubble elimination under vacuum, was spin coated with a revolution varying from 30 to 300 rpm, in such a manner that the adhesive spread substantially in an annular area between an internal peripheral edge of the disc-shaped substrate and a position of 30 mm from the internal periphery radially toward the external periphery.

Then an adhering surface of a cover sheet with a protective sheet (a polycarbonate sheet Pure Ace (trade name) with a protective sheet of a thickness of 85 μm and with a cover layer composed of polycarbonate, manufactured by Teijin Ltd.) was overlaid on the surface, coated with the adhesive material, of the intermediate layer, and the disc-shaped substrate was rotated again with a revolution varying from 30 to 8000 rpm thereby spreading the UV curable adhesive over the entire surface between the cover layer and the intermediate layer, thereby adhering the cover layer and the intermediate layer. In this state an ultraviolet irradiation was executed with a UV irradiation lamp to adhere the cover sheet with the protective sheet and the intermediate layer thereby forming a cover layer, and the protective sheet was peeled off from the surface of the cover layer to obtain an optical information recording medium of the example 2-1.

Example 2-2

An injection molded disc-shaped polycarbonate substrate (polycarbonate Panlite AD5503 (trade name), manufactured by Teijin Ltd.) of a thickness of 1.1 mm and a diameter of 120 mm, having spiral grooves (track pitch: 340 nm, groove depth: 20 nm, groove width: 160 nm) was employed, and, on a grooved surface of the substrate, an Ag film of a thickness of 120 nm was formed by sputtering as a reflective film.

Then a dye coating liquid, obtained dissolving an organic substance, represented by the compound 2, as a dye in 3 mass % in methyl lactate and agitating for 2 hours under an ultrasonic irradiation, was spin coated on a surface bearing the reflective layer of the disc-shaped substrate with a revolution varying from 300 to 4000 rpm under conditions of 23° C. and 50% RH to obtain a recording layer, which was then subjected to an annealing for 2 hours under conditions of 23° C. and 50% RH. Then, on a surface of thus formed recording layer, an intermediate layer of $ZnS-SiO_2$ of a thickness of 5 nm was formed by sputtering. In the structural formula of the organic substance represented by the compound 2, n represents an integer of 1 to 4.

Then, on a surface of thus formed intermediate layer, a UV curable adhesive (trade name SD661, manufactured by Dai-Nippon Ink and Chemicals Ltd.), subjected in advance to bubble elimination under vacuum for 6 hours, was spin coated with a revolution varying from 30 to 300 rpm, in such a manner that the adhesive spread substantially in an annular area between an internal peripheral edge of the disc-shaped substrate and a position of 30 mm from the internal periphery radially toward the external periphery.

Then an adhering surface of a cover sheet with a protective sheet (a polycarbonate sheet Pure Ace (trade name) with a protective sheet of a thickness of 85 $\mu$m and with a cover layer composed of polycarbonate, manufactured by Teijin Ltd.) was overlaid on the surface, coated with the adhesive material, of the intermediate layer, and the disc-shaped substrate was rotated again with a revolution varying from 30 to 8000 rpm thereby spreading the UV curable adhesive over the entire surface between the cover sheet and the intermediate layer, thereby adhering the cover sheet and the intermediate layer. In this state an ultraviolet irradiation was executed with a UV irradiation lamp to adhere the cover sheet with the protective sheet and the intermediate layer thereby forming a cover layer, and the protective sheet was peeled off from the surface of the cover layer to obtain an optical information recording medium of the example 2-2.

Comparative Example 2-1

A reflective layer, a recording layer and an intermediate layer were formed in succession as in the example 2-1 on a grooved surface of a disc-shaped substrate, and, on a surface of thus formed intermediate layer, a UV curable adhesive (trade name SD661, manufactured by Dai-Nippon Ink and Chemicals Ltd.), subjected in advance to bubble elimination under vacuum for 6 hours, was spin coated with a revolution varying from 30 to 300 rpm, in such a manner that the adhesive spread substantially in an annular area between an internal peripheral edge of the disc-shaped substrate and a position of 30 mm from the internal periphery radially toward the external periphery.

Then a cover sheet with a protective sheet, employed in the example 2-1, was completely separated into the protective sheet and the cover sheet, an adhering surface of the cover sheet was overlaid on the surface, coated with the adhesive material, of the intermediate layer, and the disc-shaped substrate was rotated again with a revolution varying from 30 to 8000 rpm thereby spreading the UV curable adhesive over the entire surface between the cover sheet and the intermediate layer, thereby adhering the cover sheet and the intermediate layer. In this state an ultraviolet irradiation was executed with a UV irradiation lamp to adhere the cover sheet and the intermediate layer thereby forming a cover layer and obtaining an optical information recording medium of the comparative example 2-1.

Comparative Example 2-2

A reflective layer, a recording layer and an intermediate layer were formed in succession as in the example 2-2 on a grooved surface of a disc-shaped substrate, and, on a surface of thus formed intermediate layer, a UV curable adhesive (trade name SD661, manufactured by Dai-Nippon Ink and Chemicals Ltd.), subjected in advance to bubble elimination under vacuum for 6 hours, was spin coated with a revolution varying from 30 to 300 rpm, in such a manner that the adhesive spread substantially in an annular area between an internal peripheral edge of the disc-shaped substrate and a position of 30 mm from the internal periphery radially toward the external periphery.

Then a cover sheet with a protective sheet, employed in the example 2-2, was completely separated into the protective sheet and the cover sheet, an adhering surface of the cover sheet was overlaid on the surface, coated with the adhesive material, of the intermediate layer, and the disc-shaped substrate was rotated again with a revolution varying from 30 to 8000 rpm thereby spreading the UV curable adhesive over the entire surface between the cover sheet and the intermediate layer, thereby adhering the cover sheet and the intermediate layer. In this state an ultraviolet irradiation was executed with a UV irradiation lamp to adhere the cover sheet and the intermediate layer thereby forming a cover layer and obtaining an optical information recording medium of the comparative example 2-2.

Method of Dust Evaluation

Dust included in the adhesive layer between the recording layer and the cover sheet in the optical information recording media, prepared in the examples and the comparative examples, was evaluated by observing the surface of the optical information recording medium with a telecentric microscope (trade name: TL10, manufactured by Kowa Ltd.) with a magnification of 100× and counting the number of the bubbles generated in the adhesive layer. Also a number of dust generations was determined as an average value of the numbers of the bubbles in four viewing fields. Table 2 shows the result of evaluation of the dust generation in the optical information recording media obtained in the examples and the comparative examples.

TABLE 2

| | Number of dust generation (number/viewing field) |
|---|---|
| Example 2-1 | 0 |
| Example 2-2 | 0 |
| Comp. Example 2-1 | 35 |
| Comp. Example 2-2 | 42 |

Example 3-1

Preparation of Optical Information Recording Medium

A polycarbonate substrate (polycarbonate Panlite AD5503 (trade name), manufactured by Teijin Ltd.) of a thickness of 1.1 mm and a diameter of 120 mm, having spiral grooves (depth: 100 nm, width: 120 nm, track pitch 320 nm) was formed by injection molding. On a grooved surface of thus obtained substrate, Ag was sputtered to form a reflective layer of a thickness of 100 nm (light reflective layer forming step).

Then, 20 g of a phthalocyanine dye (Orazol Blue GN (trade name; manufactured by Ciba Specialty Chemical Ltd.) were added to 1 liter of 2,2,3,3-tetrafluoropropanol and were dissolved by an ultrasonic irradiation for 2 hours to obtain a coating liquid for forming a recording layer. The prepared coating liquid was spin coated on the light reflective layer with a revolution varying from 300 to 4000 rpm under conditions of 23° C. and 50% RH. Then a storage was conducted for 1 to 4 hours under conditions of 23° C. and 50% RE to obtain a recording layer of a thickness of 100 nm (recording layer forming step). Then, on the recording layer, ZnS—$SiO_2$ was sputtered with a thickness of 5 nm to form an intermediate layer.

Formation of Cover Layer

Preparation of Sticking Adhesive Coating Liquid

An acrylic copolymer (solvent: ethyl acetate/toluene=1/1) and an isocyanate cross-linking agent (solvent: ethyl acetate/toluene=1/1) were mixed in a mass ratio of 100:1 to prepare a sticking adhesive coating liquid A.

(a) Step of Continuously Providing a Sticking Adhesive Layer Containing a Cross-Linking Agent on a Surface of the Cover Film Wound in a Roll, and (b) Step of Winding the Cover Film Provided with the Sticking Adhesive Layer Again into a Roll At first a sticking adhesive layer providing apparatus shown in FIG. 1 was employed to form a sticking adhesive layer on a surface of the cover film. A polyethylene releasing film, wound in the roll 1, was advanced in a direction indicated by an arrow, and the sticking adhesive coating liquid was coated on a surface of the releasing film by an installed coating unit 2 (coating step). Then the releasing film provided with the sticking adhesive coated layer was dried at 100° C. by drying means 3 installed in a drying area (drying step) thereby providing a releasing film provided with a sticking adhesive layer. The releasing film provided with the sticking adhesive layer was further conveyed and was adhered, in an adhering area a, with a cover film (polycarbonate film Pure Ace (trade name) having a thickness of 80 μm and having a releasing film on a surface, manufactured by Teijin Ltd.) fed from a roll 4 in such a manner that a polycarbonate surface of the cover film and the adhesive layer are in mutual contact (adhering step). Then the releasing film provided with the sticking adhesive layer and the cover film were wound together in a roll 5 (winding step).

(c) Step of Holding the Cover Film until a Cross-Linking Reaction of the Sticking Adhesive Layer is Substantially Terminated Thereafter the roll 5, formed by co-winding the releasing film provided with the sticking adhesive layer and the cover film, was stored for 72 hours in an environment of 23° C. and 50% RH. The above-mentioned "72 hours" was a time required, when the sticking adhesive layer of the present example was measured in time by an infrared absorption spectrum, for an absorption peak appearing about 2275 to 2250 $cm^{-1}$ derived from isocyanate to substantially vanish, and corresponds to a time "until the cross-linking reaction of the sticking adhesive layer is substantially terminated" in the present example.

In this step, the infrared absorption spectrum was measured by an FT-IR single reflection method under following conditions:

Measuring device: thermo Nexus 670 (trade name), manufactured by Nicore Japan Co.

Measuring accessory; OMN1-Sampler, single reflection horizontal ATR apparatus

Number of integrations: 4 $cm^{-1}$, 32 times

Detector: MCT-A (high sensitivity detector)

(d) Step of Punching the Cover Film Provided with the Sticking Adhesive Layer into a Disc Shape, and (e) Step of Maintaining the Disc-Shaped Cover Film Provided with the Sticking Adhesive Layer in a Substantially Horizontally Stacked State The releasing film provided with the sticking adhesive layer and the cover film, in a co-wound state, were advanced from the roll 5 and were punched into a shape same as that of the aforementioned substrate. A punched laminate member of the releasing film provided with the sticking adhesive layer and the cover film was fitted, as shown in FIG. 2, on a stock jig having an external diameter slightly smaller than a center hole, and was stacked by 50 units in a substantially horizontal state. The stack was maintained in this state for 1 hour.

Thereafter each member was taken out, and the releasing film at the side of the sticking adhesive material was peeled off, and the intermediate layer and the sticking adhesive layer were adhered by pressurizing means utilizing a roller to obtain an optical information recording medium.

Evaluation (1) C/N Ratio (Carrier-To-Noise Ratio)

An optical information recording medium thus prepared was subjected to recording and reproduction of a signal of a single frequency (2T=0.13 μm) under a clock frequency of 66 MHz and a linear velocity of 5.6 m/sec, by a recording-reproduction evaluation device (DDU1000 (trade name), manufactured by Pulsetech Inc.), provided with an optical pickup emitting a laser light of a wavelength of 405 nm and having a lens of a numerical aperture (NA) of 0.85, and a C/N ratio was measured by a spectrum analyzer. Obtained results are shown in Table 3.

(2) Evaluation of Unevenness in Thickness of Cover Layer

An optical information recording medium thus prepared was subjected to a measurement of a thickness of the cover layer, measurable as a sheet distance between two points by a laser displacement meter (LT8020 (trade name), manufactured by Keyence Inc.) at 8 points (interval 45°) along the circumferential direction of the optical information recording medium and 8 points in the radial direction (internal 5 mm), or in 64 points in total, and an unevenness in the thickness was determined from a value of (maximum value minus average value) and a value of (average value minus minimum value). Results are shown in Table 3.

(3) Adhesive Power

An optical information recording medium thus prepared was let to stand for 48 hours in an environment of 80° C. and 85% RH. Thereafter it was tried to manually peel off the cover layer of the optical information recording medium, and the result was rated as − if the peeling was possible, ± if the peeling did not occur but a dogear occurred at an end, and + if the peeling did not occur. Results are shown in Table 3.

Example 3-2

An optical information recording medium of the example 3-2 was prepared in the same manner as in the example 3-1, except that, in the step (c) of holding the cover film until a cross-linking reaction of the sticking adhesive layer is substantially terminated in the example 3-1, the roll 5 formed by co-winding the releasing film provided with the sticking adhesive layer and the cover film was maintained for 168 hours in an environment of 23° C. and 50% RH.

The prepared optical information recording medium was subjected to evaluations similar to those in the example 3-1. Results are shown in Table 3.

Example 3-3

An optical information recording medium of the example 3-3 was prepared in the same manner as in the example 3-1, except that, in the step (e) of maintaining the disc-shaped cover film provided with the sticking adhesive layer in a substantially horizontally stacked state in the example 3-1, the punched laminate member of the releasing film provided with the sticking adhesive layer and the cover film was stacked in 50 units and maintained in this state for 24 hours.

The prepared optical information recording medium was subjected to evaluations similar to those in the example 3-1. Results are shown in Table 3.

Comparative Example 3-1

An optical information recording medium of the comparative example 3-1 was prepared in the same manner as in the example 3-1, except that, in the step (c) of holding the cover film until a cross-linking reaction of the sticking adhesive layer is substantially terminated in the example 3-1, the roll 5 formed by co-winding the releasing film provided with the sticking adhesive layer and the cover film was maintained for 48 hours in an environment of 23° C. and 50% RH. The storage time of 48 hours is outside a range where the cross-linking reaction of the sticking adhesive layer is substantially terminated.

The prepared optical information recording medium was subjected to evaluations similar to those in the example 3-1. Results are shown in Table 3.

Comparative Example 3-2

An optical information recording medium of the comparative example 3-2 was prepared in the same manner as in the example 3-1, except that the step (e) of maintaining the disc-shaped cover film provided with the sticking adhesive layer in a substantially horizontally stacked state in the example 3-1 was eliminated.

The prepared optical information recording medium was subjected to evaluations similar to those in the example 3-1. Results are shown in Table 3.

Comparative Example 3-3

An optical information recording medium of the comparative example 3-3 was prepared in the same manner as in the example 3-1. except that, in the preparation of the sticking adhesive coating liquid in the example 3-1. the isocyanate cross-linking agent was not employed.

The prepared optical information recording medium was subjected to evaluations similar to those in the example 3-1. Results are shown in Table 3.

Comparative Example 3-4

The sticking adhesive coating liquid A employed in the example 3-1 was spin coated on a surface of a releasing film punched in advance into a disc shape. On a sticking adhesive layer formed by the sticking adhesive coating liquid A, a polycarbonate film similarly punched into a disc shape was adhered, and was thereafter maintained for 72 hours. Thereafter an optical information recording medium of the comparative example 3-4 was prepared in the same manner as in the example 3-1, except that the cover layer was formed by stacking 50 units in a substantially horizontal state as shown in FIG. 2 and holding them for 1 hour. The releasing film and the polycarbonate film were same as those employed in the example 3-1.

The prepared optical information recording medium was subjected to evaluations similar to those in the example 3-1. Results are shown in Table 3.

TABLE 3

|  | Cross-linking agent | Coating method | Storage time in roll (hr) | Storage time in horizontal state (hr) | C/N (dB) | Unevenness in thickness ($\mu$m) | Adhesive power |
|---|---|---|---|---|---|---|---|
| Ex. 3-1 | present | continuous coat in roll | 72 | 1 | 52 | ±1 | + |
| Ex. 3-2 | present | continuous coat in roll | 168 | 1 | 51 | ±0.8 | + |
| Ex. 3-3 | present | continuous coat in roll | 72 | 24 | 55 | ±0.9 | + |
| Comp. Ex. 3-1 | present | continuous coat in roll | 48 | 1 | 45 | ±4 | ± |
| Comp. Ex. 3-2 | present | continuous coat in roll | 72 | 0 | 41 | ±1 | + |
| Comp. Ex. 3-3 | none | continuous coat in roll | 72 | 1 | 49 | ±1 | − |
| Comp. Ex. 3-4 | present | spin coat | 0 | 1 | 38 | ±6 | + |

Example 4-1

A roll 5 was prepared through the steps (a) to (c) as in the example 3-1. Then, as a step (d) of punching the cover film provided with the sticking adhesive layer into a disc shape, and a step (e) of maintaining the disc-shaped cover film provided with the sticking adhesive layer in a substantially horizontally stacked state, the releasing film provided with the sticking adhesive layer and the cover film, in a co-wound state, were advanced from the roll 5 and punched in a shape same as that of the aforementioned substrate. A punched laminate member, formed by the releasing film provided with the sticking adhesive layer and the cover film, was fitted substantially vertically in a stock jig 40 which is perpendicularly provided, as shown in FIG. 3, to a base 30 fixed on a fixed plane F, and was stacked in 50 units. In this state, a spacer 50 was positioned at a distance from the base 30, equal to a thickness of the stack. The stack was held for 1 hours in this state.

Thereafter each member was taken out, and the releasing film at the side of the sticking adhesive material was peeled off, and the intermediate layer and the sticking adhesive layer were adhered by pressurizing means utilizing a roller to obtain an optical information recording medium.

Evaluations were made on (1) C/N (carrier-to-noise) ratio, (2) unevenness in thickness of the cover layer, and (3) adhesive power, as in the example 3-1. Results are shown in Table 4.

Also recording media of examples 4-2 to 4-3 and comparative examples of 4-1 to 4-4 were prepared respectively through processes similar to those of the examples 3-2 to 3-3 and the comparative examples 3-1 to 3-4 except that a step (e) of maintaining the disc-shaped cover film provided with the sticking adhesive layer in a substantially vertically stacked state was employed, and were evaluated as in the example 4-1. Results are shown in Table 4.

Results in Tables 3 and 4 indicate that the optical information recording media of the examples 3-1 to 3-3 and 4-1 to 4-3, prepared by the producing method of the present invention, had satisfactory results on the C/N ratio of the recording characteristics, the unevenness in the thickness and the adhesive power.

On the other hand, the optical information recording media of the comparative examples 3-1 to 3-4 and 4-1 to 4-4 were found to be inferior, in the C/N ratio of the recording characteristics, to those of the examples 3-1 to 3-3 and 4-1 to 4-3. It was also revealed that the unevenness in the thickness and the adhesive power became inferior in case the cross-linking reaction of the sticking adhesive layer is not substantially completed as in the comparative examples 3-1, 3-2, 4-1 and 4-2, or in case the cross-linking agent was not employed in the sticking adhesive layer as in the comparative example 3-3 and 4-3. Furthermore, it was found that the adhesive power was significantly lowered in case the holding step in the substantially vertical step as in the examples 3-3 and 4-3 were dispensed with. Also the C/N ratio of the recording characteristics was low and the unevenness in the thickness was large in case where the sticking adhesive layer was formed by spin coating and the cross-linking reaction of the sticking adhesive layer was not substantially terminated as in the comparative examples 3-4 and 4-4.

What is claimed is:

1. A method for manufacturing an optical information recording medium having a track pitch of 200 to 400 nm and a groove depth of 20 to 150 nm, and being capable of recording and reproducing using a light with a wavelength of 450 nm or less, the method at least comprising:

a metal reflective layer forming step for forming a metal reflective layer on a substrate;

a recording layer forming step for forming a recording layer containing an organic dye on said metal reflective layer; and a cover layer forming step for forming a cover layer on said recording layer;

in this order, wherein said cover layer forming step includes a step of adhering, onto said recording layer, a cover layer composed of a cover film provided with a sticking adhesive layer so that said sticking adhesive layer comes into contact with a surface of said recording layer, and wherein said cover layer is prepared through;

a step of continuously providing a sticking adhesive layer containing a cross-linking agent on a surface of a cover film wound in a roll;

a step of winding said cover film provided with said sticking adhesive layer again into a roll;

TABLE 4

| | Cross-linking agent | Coating method | Storage time in roll (hr) | Storage time in vertical state (hr) | C/N (dB) | Unevenness in thickness (μm) | Adhesive power |
|---|---|---|---|---|---|---|---|
| Ex. 4-1 | present | continuous coat in roll | 72 | 1 | 54 | ±1 | + |
| Ex. 4-2 | present | continuous coat in roll | 168 | 1 | 53 | ±0.9 | + |
| Ex. 4-3 | present | continuous coat in roll | 72 | 24 | 56 | ±0.9 | + |
| Comp. Ex. 4-1 | present | continuous coat in roll | 48 | 1 | 46 | ±4 | ± |
| Comp. Ex. 4-2 | present | continuous coat in roll | 72 | 0 | 41 | ±1 | + |
| Comp. Ex. 4-3 | none | continuous coat in roll | 72 | 1 | 48 | ±1 | − |
| Comp. Ex. 4-4 | present | spin coat | 0 | 1 | 37 | ±6 | + | a step of storage until a cross-linking reaction of said sticking adhesive layer is substantially terminated;

a step of punching said cover film provided with said sticking adhesive layer into a disc shape; and a step of storing said cover film provided with said sticking adhesive layer of a disc shape in a stack in a substantially horizontal state or vertical state, in succession.

2. The method for producing an optical information recording medium according to claim 1 wherein said light is a laser light having a wavelength of 450 nm or less, said cover layer has a thickness of 0.01 to 0.5 mm, and a time from immediately after a completion of said metal reflective layer forming step to a start of said cover layer forming step is 12 hours or less.

3. The method for producing an optical information recording medium according to claim 1, wherein the step of storing stores said cover film provided with said sticking adhesive layer of a disc shape in the stack in the substantially horizontally state.

4. The method for producing an optical information recording medium according to claim 1, wherein the step of storing stores said cover film provided with said sticking adhesive layer of a disc shape in the stack in the substantially vertical state.

5. The method for producing an optical information recording medium according to claim 2, wherein in said time from immediately after a completion of said metal reflective layer forming step to a start of said cover layer forming step, a storage temperature is 20 to 40° C. and a storage humidity is 30 to 80%.

6. The method for producing an optical information recording medium according to claim 3, wherein said step of continuously providing a sticking adhesive layer containing a cross-linking agent on a surface of a cover film wound in a roll includes:

a step of continuously coating a sticking adhesive material containing a cross-linking agent on a surface of a releasing film wound in a roll, thereby forming a sticking adhesive coated layer;

a step of drying the sticking adhesive coated layer formed on the surface of said releasing film; and a step of adhering so that said sticking adhesive coated layer comes into contact with the surface of the cover film.

7. The method for producing an optical information recording medium according to claim 6, wherein said sticking adhesive material is an acrylic sticking adhesive material.

8. The method for producing an optical information recording medium according to claim 6, wherein said cross-linking agent is an isocyanate cross-linking agent.

9. The method for producing an optical information recording medium according to claim 4, wherein said step of continuously providing a sticking adhesive layer containing a cross-linking agent on a surface of a cover film wound in a roll includes:

a step of continuously coating a sticking adhesive material containing a cross-linking agent on a surface of a releasing film wound in a roll, thereby forming a sticking adhesive coated layer;

a step of drying the sticking adhesive coated layer formed on the surface of said releasing film; and a step of adhering in such a manner that said sticking adhesive coated layer comes into contact with the surface of the cover film.

10. The method for producing an optical information recording medium according to claim 9, wherein said sticking adhesive material is an acrylic sticking adhesive material.

11. The method for producing an optical information recording medium according to claim 10, wherein said cross-linking agent is an isocyanate cross-linking agent.

* * * * *